United States Patent
Dragnea (10) Patent No.: US 9,990,771 B2
(45) Date of Patent: Jun. 5, 2018

(54) METHOD AND SYSTEM OF DISPLAYING INFORMATION DURING A MEDICAL PROCEDURE

(71) Applicant: Aurelian Viorel Dragnea, Hoboken, NJ (US)

(72) Inventor: Aurelian Viorel Dragnea, Hoboken, NJ (US)

( * ) Notice: Subject to any disclaimer, the term of this patent is extended or adjusted under 35 U.S.C. 154(b) by 0 days. days.

(21) Appl. No.: 14/012,102

(22) Filed: Aug. 28, 2013

(65) Prior Publication Data

US 2015/0062157 A1   Mar. 5, 2015

(51) Int. Cl.
G09G 5/00 (2006.01)
G06T 19/00 (2011.01)

(52) U.S. Cl.
CPC ........ *G06T 19/006* (2013.01); *G06T 2210/41* (2013.01)

(58) Field of Classification Search
CPC ....... A61B 3/005; A61B 34/20; A61B 5/0077; A61B 34/25; A61B 5/742; A61B 2034/105; A61B 2090/502; A61B 2034/2051; A61B 5/6803; A61B 5/4538; A61B 2505/05; A61B 34/35; A61B 2090/365; A61B 34/10; A61B 90/37; A61B 1/00048; A61B 2090/368; A61B 2090/371; A61B 1/00193; A61B 2034/102; A61B 2050/3015; A61B 46/00; A61B 2034/107; G06F 19/325; G06F 3/0484; G06F 3/011; A61K 41/00
See application file for complete search history.

(56) References Cited

U.S. PATENT DOCUMENTS

| | | | |
|---|---|---|---|
| 6,847,336 B1 * | 1/2005 | Lemelson .......... | A61B 1/00048 345/8 |
| 2007/0078678 A1 * | 4/2007 | DiSilvestro ............ | G06Q 50/22 705/2 |
| 2012/0127062 A1 * | 5/2012 | Bar-Zeev ................. | G02B 3/14 345/6 |
| 2014/0081659 A1 * | 3/2014 | Nawana et al. .................. | 705/3 |

* cited by examiner

*Primary Examiner* — Xilin Guo
(74) *Attorney, Agent, or Firm* — Porzio Bromberg & Newman P.C.

(57) ABSTRACT

A method and system including a head mounted display for displaying information to a user when performing a medical procedure is described. A user wearing the head mounted display device can view objects, while simultaneously receiving and displaying feedback information on a procedure being performed. Text and graphical information is presented in a position on the head mounted display so that the object or a part of an object out of the line of sight appears in the same location and with the same shape, size and orientation as if the object or part of an object were visible to the user.

10 Claims, 5 Drawing Sheets

METHOD AND SYSTEM OF DISPLAYING INFORMATION DURING A MEDICAL PROCEDURE

BACKGROUND OF THE INVENTION

Field of the Invention

The present invention relates to a method and system of displaying information during a medical procedure in which a head mounted display is used to display information to the user.

Description of Related Art

Intramuscular injections may damage peripheral nerves at the site of injection. The site of injection is the crucial factor in determining the degree of nerve fiber injury. During medical procedures, nurses and doctors lack real time accurate information about where certain nerves or organs are in relation to a syringe needle or other medical devices that they are using during the procedure.

Surgical operations may inadvertently damage organs due to a surgeon not having real time information about the location of an organ, and the distance between surgical tools and the organs since the surgeon relies only on his experience and memory.

For patients in isolated locations, remotely located surgeons may assist local personnel in performing difficult surgical operations. The local personnel may not know exactly what he is looking for.

SUMMARY OF THE INVENTION

The present invention relates to a method and system including a head mounted display for displaying information to a user when performing a medical procedure. Preferably the head mounted device is at least partially see-through. A user wearing the head mounted display device can view objects, while simultaneously receiving and displaying feedback information on a procedure being performed, including living organs and tools within the user's field of view. For example, the feedback information can be text information. The text is presented at a position on the head mounted display so that the information does not interfere with the user's ability to perform or assist in the procedure. The feedback information can also include graphical information representing an object or a part of an object out of the line of sight. The graphical information is presented in a position on the head mounted display so that the object or a part of an object out of the line of sight appears in the same location and with the same shape, size and orientation as if the object or part of an object were visible to the user so that it seems to the user that the graphical representation is a real object. The displayed parts of objects are a simulation and not the real object. As such, the displayed object would be only an approximation of the real object.

In a further aspect, a computer implemented method provides the information to the head mounted display to enhance the ability of a user wearing the head mounted display to perform a medical procedure. The method can be initiated by receiving an indication that a user is performing a medical procedure. The user's field of view through the head mounted display is determined and objects within the field of view both in the line of sight and out of line of sight at the sight of the medical procedure. Relevant objects for the medical procedure are selected and information about the relevant objects that are in the field of view of the user are retrieved. The relevant object's information can include the shape, size location or the orientation. Supplemental information which is to be provided to the user can be calculated or retrieved from data storage. The supplemental information is displayed in the head mounted display and can change as the user's field of view changes or relevant object's properties and actions within the medical procedure change.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1A:
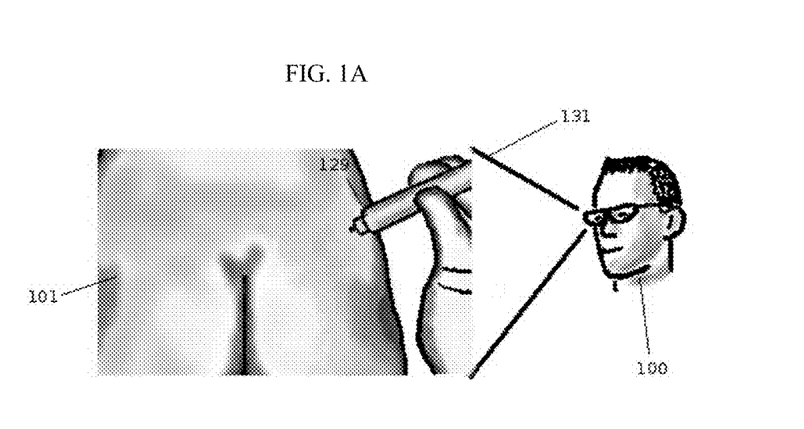
FIG. 1A is a schematic diagram of a user with a head mounted display used while performing a medical procedure (an injection).
Figure 1B:
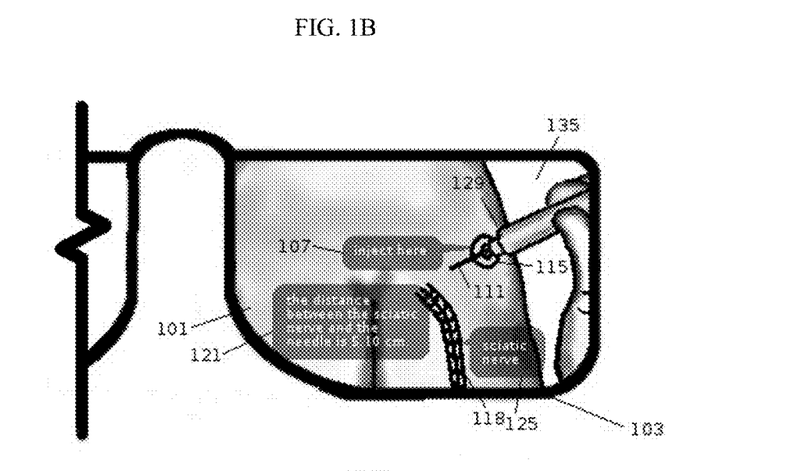
FIG. 1B is a schematic diagram of a display of information directed to the medical procedure (an injection) on the head mounted display shown in FIG. 1A.

FIGS. 1A and 1B shows user 100 wearing a head mounted display device 103 performing a medical procedure. As used herein a medical procedure is a procedure performed on an animal, such as a human being, performance of a practical work, or an action or operation performed for diagnosing a problem or disease. The medical procedure, in this example, is an injection.

As used herein an object is anything within the medical procedure, including people, animals, living organs, tools or other objects, both in the line of sight or out of the line of sight. All the objects and actions within the field of view of a user comprise a scene. Scenes generally change over time.

User 100 has a field of view 131 as shown in FIG. 1A. Within field of view 131 are various objects, such as living bodies, living organs, and/or medical tools. Some of these objects may be partially or totally out of the line of sight, and in effect invisible to the user.

As used herein attending the medical procedure means either performing the medical procedure or assisting somebody else performing the medical procedure. As used herein the field of view is the angular extent of a given scene that is imaged by a camera or seen by eyes.

As used herein a database is a collection of data organized especially for rapid search and retrieval. As such, both relational database and a flat file database are databases.

During the medical procedure, the user may change his location in the room where the medical procedure is performed or may move their head or eyes. The present invention utilizes various techniques to track the user's location, the user's head and eyes location and orientation to determine the user's field of view, in order to present the user with supplemental information regarding the operation at which the user is in attendance.

Figure 2:
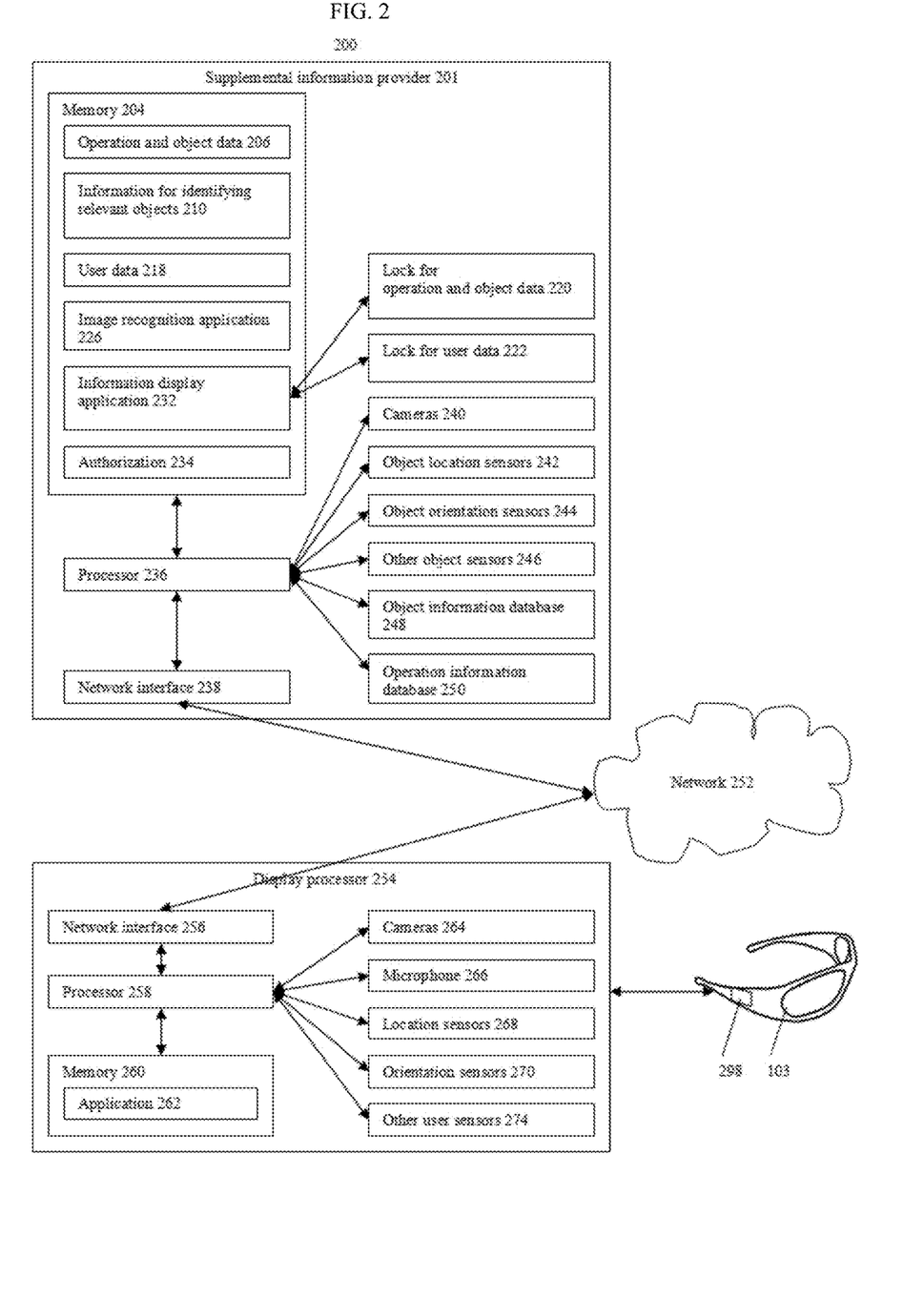
FIG. 2 is a schematic diagram of a system for displaying information during a medical procedure.
Figure 4:
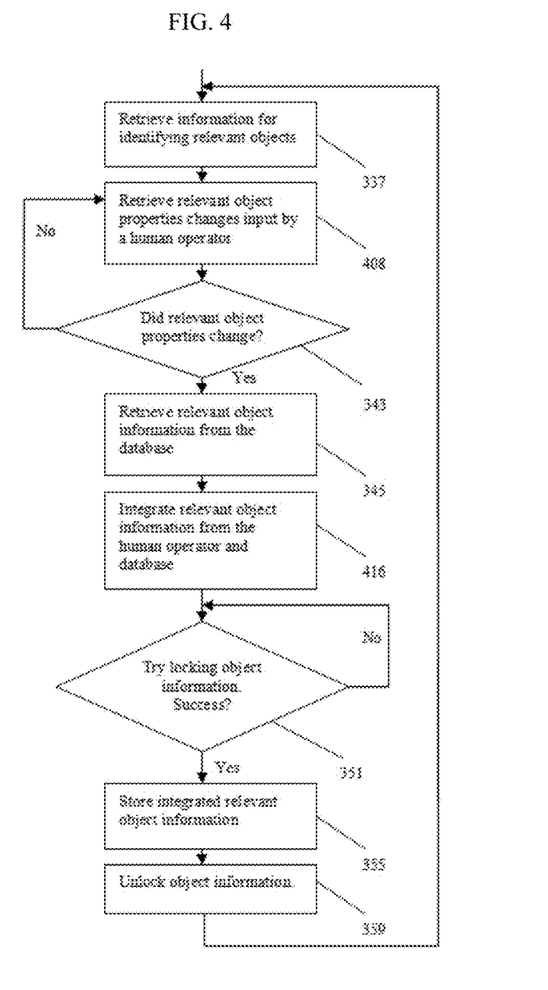
FIG. 4 is a flow diagram of an alternate thread of execution for tracking the objects location, shape and orientation, in which a human operator is responsible for updating objects' properties, so that they correspond to the ones from the medical procedure.
Figure 5:
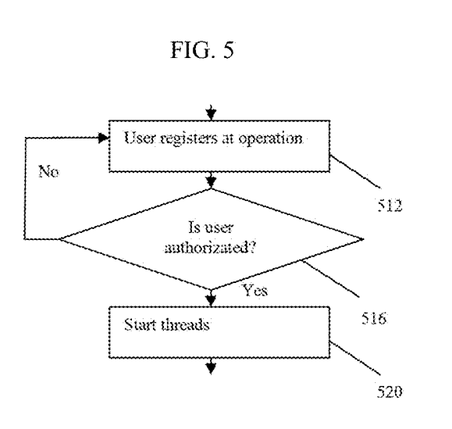
FIG. 5 is a flow diagram of main application thread for execution of the method of the present invention.

The main application and thread for performing the method for displaying information during a medical procedure start at step 512, as shown in FIG. 5. The user logs in at steps 512 and 516. In step 516, it is determined if the user is authorized. If the user is authorized, information display application 232 receives an indication that the user is attending a medical procedure as shown in FIG. 2. Referring to FIG. 5, step 520 is performed to activate secondary threads described in FIG. 2, 3A, 3B, 3C or 4.

As shown in FIG. 1A, the user viewing an medical procedure would see the operation subject and tools. User 100 is wearing head mounted display device 103. Head mounted display device 103 is transparent or semitransparent, with the capability to overlay information in display field 135. Head mounted display device 103 is capable of generating display elements on various portions of head mounted display device 103 while remaining portions of head mounted display device 103 are transparent to allow the user to continue to view objects during the course of the medical procedure. Head mounted display device 103 is capable of generating display elements on various portions of a user's display so that it gives the user the illusion of 3D representations of portions of objects that are out of line of sight. Visible objects 101 are in field of view 131 and in the line of sight.

As used herein a displayed object is an object out of the line of sight whose graphical representation is generated on the display.

As used herein, a model of an object is information that is sufficient to be used by a head mounted display device to display an approximation of the object at the same position, size and shape as though the object was visible to the user. As used herein, a generic model of an object is information that describes the object but it is not sufficient to be used by a head mounted display device to display an approximation of the object with the same position, size and shape as though the object was visible to the user. As used herein, integrating is used for obtaining a model of an object. Information must be integrated for each head mounted display device individually. A generic model of an object can be integrated with information from sensors to obtain a model of the displayed object. When displaying the model of the displayed object, the model of the displayed object appears to the user at the same location and with the same shape, size and orientation as if the displayed object were visible to the user. The precision of the displayed model provides useful feedback information to the user.

FIG. 1B illustrates supplemental information which can be provided to user 100. FIG. 1B is a partial view of display field 135 of one lens of a head mounted display device 103 such as that shown in FIG. 1A. In FIG. 1B, supplemental information display elements 107, 111, 115, 118, 121, 125 are displayed on display field. Supplemental information display element 107 including text, supplemental information display element 115 including a bulls eye and supplemental information display element 125 including text are intended to teach or assist the user. Supplemental information display element 111 including an out of sight element, supplemental information display element 118 including a graphic display object of the sciatic nerve and supplemental information element 121 are intended to give feedback to the user. Supplemental information 118 displays graphically a representation of the sciatic nerve. Supplemental information display element 111 displays graphically a representation of the used tool in the medical procedure, for example a syringe needle. Both the sciatic nerve and at least portions of the syringe needle are not in the line of sight, and hence, not visible. Supplemental information display element 121 includes text of a calculated distance between the displayed object of the sciatic nerve and the displayed object of a needle of syringe 129.

FIG. 2 is a block diagram of system for displaying information during a medical procedure 200. Head mounted display device 103 is coupled to display processor 254. Head mounted display device 103 includes a number of sensors 298. Sensors 298 can include cameras, orientation sensors, location sensors and other sensors. Display processor includes network interface 256, processor 258, memory 260, microphone input 266 location sensors input 268, and/or orientation sensors input 270. Display processor 254 is coupled to head mounted display device 103 through any number of various means, as described below. Display processor 254 is connected to network 252, such as the Internet, using network interface 256 to couple head mounted display device 103 to supplemental information provider 201. Processor 258 executes programmatic instructions from application 262 and other services described herein. Display processor 254 can include any of the examples of processing devices described herein. Camera input 264 and microphone input 266 provide respective visual and sound information to supplemental information provider 201 and application 262. Camera input 264 can receive image and video data from sensors 298 of head mounted display device 103 which sensors 298 may include one or more of a face forward camera, one or more eye facing camera, or both. Microphone input 266 can receive audio from a microphone on the head mounted display device 103 or on a processing device associated with the user and the display. Orientation sensors input 270 receive input from one or more accelerometers, gyroscopes and magnetometers on head mounted display device 103, the data from which can be used to measure the head location and orientation of the user. Other sensors inputs 274 receive information from additional sensors from user sensors 298.

Supplemental information provider 201 includes network interface 238, processor 236, memory 204, object orientation sensors 244, object location sensor 242, other object sensor 246, object information database 248 which can containing generic models of at least some of the operation objects and operation information database 250. Both object information database 244 and operation information database 250 can be flat file databases. Other embodiments can use other types of databases, such as relational databases, or use general data storage. Supplemental information provider 201 is connected to network 252, such as the Internet, using the network interface 238. Processor 236 executes programmatic instructions from application 232 and other services described herein. Supplemental information provider 201 can include storage means for supplemental operation information 206, storage means for the information for identifying relevant objects 210, storage means for user data including location and orientation 218, information display application 232, image recognition application 226 and authorization application 234. Operation and object data 206 stores information about the objects from object information database 248 integrated with data retrieved from object orientation sensors 244, object location sensors 242, other object sensors 246 for example ultrasound sensors or other sensors. Information about the medical procedure relevant objects and instructional supplemental information are stored in operation information database 250.

The information for identifying relevant objects can be a unique id or a unique name for each relevant object. The information for identifying relevant objects can contain unique type ids or unique type names as well. In this case, each syringe type and each needle type can have an unique id, and each individual syringe and each individual syringe needle can have their own id.

As an example, information for identifying relevant objects is retrieved from the operation information database 250 and saved to the information for identifying relevant objects memory location 210. Information about the syringe 129, syringe needle and the sciatic nerve from FIG. 1B are retrieved from object information database 248 using the information for identifying relevant objects. Then relevant object properties which can include location, orientation, shape are retrieved using object location sensors 242, object orientation sensors 244 and other object sensors 246, again using the information for identifying relevant objects. The information retrieved from operation information database 250 and the information retrieved from object location sensors 242, object orientation sensors 244 and other object sensors 246 are integrated by information display application 232. Thereafter, supplemental information display element 111 such as the needle can be displayed. A general shape and location for the sciatic nerve is retrieved from object information database 248, and then the sciatic nerve shape, orientation, size and location is updated using information from cameras 240 and using image recognition application 226 at step 416 in FIG. 4. Thereafter, supplemental information display element 118 can be displayed, or supplemental information display element 121 can be calculated and displayed as shown in FIG. 1B.

Supplemental information elements 111 and 118 can be displayed in 3D if the user chooses that the supplemental information be displayed for both eyes at the same time. Alternatively, the supplemental information can be displayed for only one eye, so that the user is not overwhelmed with information.

Figure 3A:
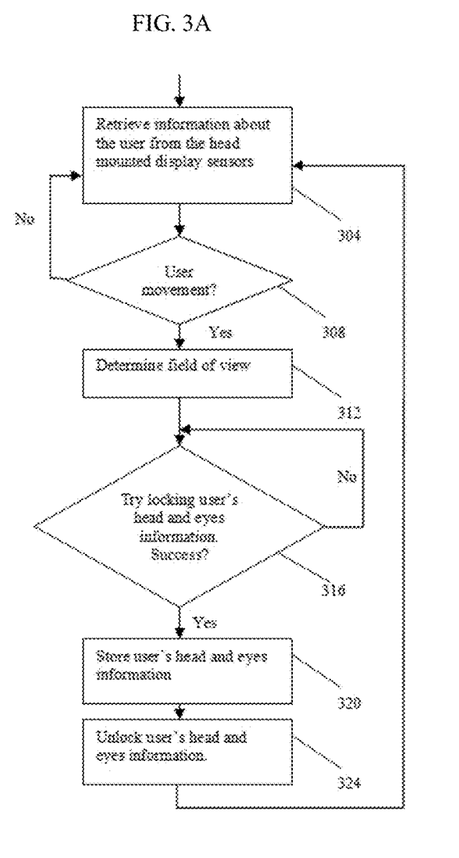
FIG. 3A is a flow diagram of a thread of execution for processing user head and eyes movement.
Figure 3B:
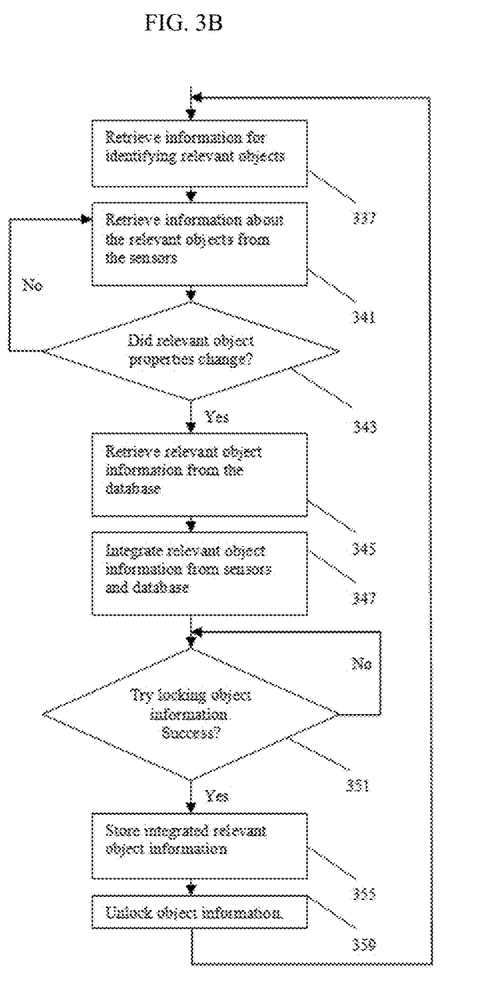
FIG. 3B is a flow diagram of a thread of execution for tracking properties of objects such as location, shape, size and orientation.
Figure 3C:
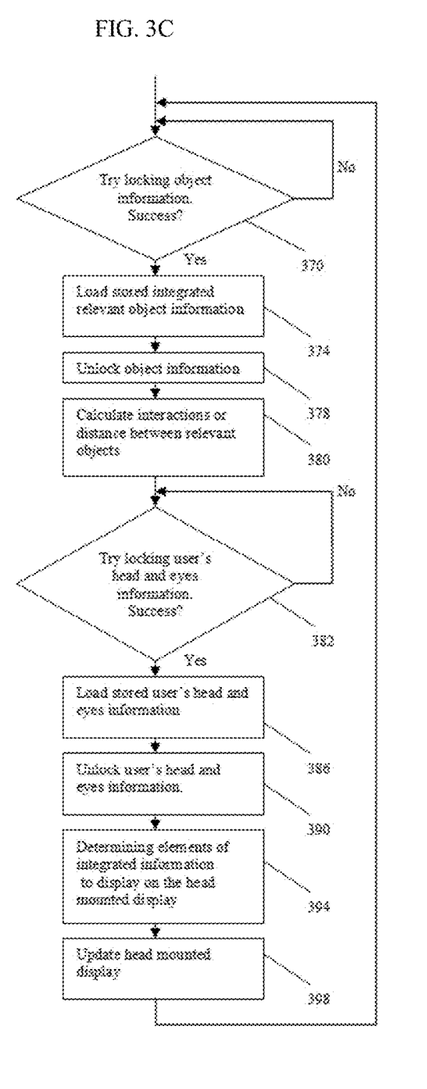
FIG. 3C is a flow diagram of a thread of execution for combining both the user head and eyes information and the objects' location, orientation and shape, and determining how and where to display the resulting information, and then displaying the information on the head mounted display.

FIG. 3A, FIG. 3B and FIG. 3C represent flow diagrams of parts of the method of the present invention. There are three separate threads. These threads are part of the information display application 232 shown in FIG. 2. The memory locations accessed by multiple threads are protected by locks. Other embodiments can use processes instead of threads, and mutexes, critical sections or other mutual exclusion mechanisms instead of locks. Other embodiments can use any combination of threads, processes, or polling and the corresponding mutual exclusion mechanisms.

The thread of execution for processing user head and eye movements starts at step 304. The user's movements are monitored at step 304. The user movements' monitoring includes information being retrieved from location sensors 268 and orientation sensors 270. The retrieved information is checked for change such as movements that at step 308. If user movement was determined, a new field of view is calculated at step 312. Lock for user data 222 shown in FIG. 2. is locked at step 316, and then the head and eye information and the field of view are stored at step 320. The head and eye information and the field of view are stored at operation data memory location 218 shown in FIG. 2. The lock for user data 222 shown in FIG. 2 is unlocked at step 324.

The thread for execution for tracking properties of starts at step 337 as shown in FIG. 3B. The information for identifying relevant objects is retrieved at step 337. The relevant objects' properties which can include movement or shape are monitored at step 341. The relevant objects' properties monitoring includes retrieving information that can include the shape, size, location or orientation of the relevant objects that are in the field of view of the user at the moment. The retrieved information is checked for changes at step 343. Information about the objects is retrieved from the object information database 248 shown in FIG. 2 at step 345. Object information is integrated at step 347 using both data retrieved from the database and data retrieved from the sensors at step 341, for example to create models of displayed objects of the medical procedure. Lock for operation and object data 220 shown in FIG. 2 is locked at step 351. Thereafter, the integrated object information, such as models of the operation objects, is stored at step 355. The integrated object information is stored at the operation and object data memory location 206 shown in FIG. 2. Lock for operation and object data 220 shown in FIG. 2 is unlocked at step 359.

The thread of execution for displaying the information starts at step 370 as shown in FIG. 3C. Lock for operation and object data 220 shown in FIG. 2 is locked at step 370, and stored integrated information such as head and eye information and the field of view are loaded at step 374. The integrated object information is loaded from operation and object data memory location 206 shown in FIG. 2. Lock for operation and object data 220 shown in FIG. 2 is unlocked at step 378. Interactions or distance between objects are calculated at step 380. Lock for user data 222 shown in FIG. 2. is locked at step 382, and then stored user information such as head and eye information and the field of view are loaded at step 386. Lock for user data 222 shown in FIG. 2. is unlocked at step 390. Determining which elements of supplemental information from least the relevant objects in the field of view and out of line of sight is performed at step 394. Data, shapes and text, colors, text size to display are determined at step 394 as well. For example, users can select between different types and amounts of supplemental information to be displayed, such as for teaching or feedback supplemental information, size of the text, types of graphical representation for the displayed objects such as wire-frame colors for the displayed objects, text and other preferences. The head mounted display is updated at step 398.

As an example of integrating object information at step 347, the length of the syringe needle and information about the syringe (a generic model) is retrieved from object information database 248, the location and the orientation of the syringe, information about how full a syringe is and the type of the syringe and the syringe needle is recovered using camera inputs 264 from the cameras of sensors 298 and image recognition algorithms or additional sensors. The information retrieved from the database represents a model of a syringe and a model of a needle. All of the information is used to completely determine the location, orientation, size and shape of the syringe and the syringe needle even if the syringe is partially or totally out of line of sight to create a model of the syringe and of the syringe needle that approximate the real objects.

Another example of integrating object information at step 347, the shape, orientation and location for an organ (sciatic nerve in our case) for a generic person (a generic model of the sciatic nerve) is retrieved from object information database 248. The information retrieved from the database represents a model of the organ. Then the size and location of the actual patient are retrieved using additional sensors 246. The information retrieved from the database and the information retrieved from the sensors are integrated and the shape, location, orientation and size of the organ are obtained. The new shape, orientation and location represents a model that approximates the shape, orientation and location of the real organ.

At step 394, display processor 254 calculates points and polygons on a surface of the syringe and the syringe needle using information calculated at step 347 and the user's head and eye information which includes the field of view retrieved at step 304, and loaded at step 386. Display processor 254 determines what information and where the information should be displayed to the user, and displays parts of the syringe and the syringe needle that are both in the field of view and out of the field of sight such as supplemental information display element 111, supplemental information display element 118 such as an organ, supplemental information display element 107 such as supplemental text information, supplemental information display element 115 such as a bulls eye and supplemental information display elements 121 and 125 such as supplemental text information shown in FIG. 1B.

The supplementary information to be displayed to the user at step 398 can include: shapes of the relevant objects in the field of view and out of line of sight of the user, instructional supplemental information such as the place of an injection or an incision, or other supplemental information such as the distance between the syringe needle and the sciatic nerve. A warning can be displayed as text or graphics if the syringe needle and the sciatic nerve get too close to each other.

FIG. 4 illustrates an alternate embodiment for the thread for execution for tracking properties of starts at step 337. The information for identifying relevant objects is retrieved at step 337. The human operator input which can include the relevant objects' movement or shape changes are monitored at step 408. The retrieved information is checked at step 343. Information about the objects is retrieved from database 230 shown in FIG. 2 at step 345. Object information is integrated at step 416 using both data retrieved from the database and data retrieved from the user input at step 408. Lock for operation and object data 220 shown in FIG. 2 is locked at step 351. Thereafter, the integrated object information is stored at step 355. The integrated object information is stored at the operation and object data memory location 206 shown in FIG. 2. The lock for operation and object data 220 shown in FIG. 2 is unlocked at step 359.

In another embodiment, object sensors 246, such as ultrasound, can retrieve real time information such as shape, orientation, location about the relevant objects. Information from the object information database 248 can help identify the relevant objects and isolate them. Processor 236 will run information display application 232 for isolating information about the relevant objects and recovering the shape of the relevant objects. For example, the isolated information about the relevant organs represents the models of the organs. For the ultrasound sensor example, information display application 232 can use for isolating objects rules that are usually used for reading an ultrasound image, such as skin appears smooth and bright, fat can be bright or dark, but subcutaneous fat is typically dark, muscle is also dark, when viewed in cross section, but in long section sound is reflected back by the muscle fibers and the internal structure of the muscle can be easily seen, tendons are typically bright, but this varies with their orientation relative to the probe, bone appears as a particularly bright line bright line due to the dramatic difference in acoustic impedance between bone and soft tissue. Operation and object data 206 stores the models of the relevant objects. The precision should be good enough so that the displayed model gives useful feedback information to the user. In this embodiment, models of organs such as the heart can be displayed moving in real time with the same shape, size and orientation as if the object were visible to the user.

In another embodiment, sensors 246, such as ultrasound, retrieve 3D real time information about some of the objects from the scene. Thereafter, this information can be displayed as transparent or semitransparent voxels making up objects with the same shape, size and orientation as if the user was able to watch the real objects being transparent or semi-transparent. The colors of the voxels are either the ones that came directly from the sensor, or are alternative colors. Processor 236 will run the information display application 232 for calculating the size and the position of the voxels and alternative colors.

In another embodiment, sensors 246, such as ultrasound, can retrieve 2D real time information about some of the objects from the scene. In effect the 2D real time information represents a section through the objects. Then this information will be displayed as a projection on a plane as though the user was able to watch a section through the organs. The colors of the texture pixels are either the ones that came directly from the sensor, or are alternative colors. Processor 236 will run information display application 232 for calculating the orientation and the position of the plane and the texture to be projected onto the said plane.

The present embodiment uses one main calculator containing processor 236 and memory 204 and a secondary calculator containing processor 258 and memory 260 for each user. Other embodiments can use different configurations, such as only one calculator, containing processor 236 and memory 204, and also performing the work performed by the secondary calculators.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for displaying information to a user during a medical procedure comprising the steps of:
   a. determining a field of view of the user through a head mounted display device worn by the user using one or more sensors for determining the field of view, the one or more sensors for determining the field of view include active sensors for sensing head orientation of the user, head location of the user, eye or eyes location of the user, or the eye or eyes orientation of the user;
   b. retrieving object information on one or more objects within the medical procedure within the field of view from the one or more sensors, the one or more objects within the medical procedure include one or more medical tools used in real time in the medical procedure and living bodies and/or living organs of the medical procedure, checking if the properties of the one or more object changed, the properties being selected from location, shape, size and orientation;

c. retrieving by a processor supplemental object information from data storage, said supplemental object information includes one or more 3D generic models of the one or more objects from step b. in the field of view;

d. integrating by a processor said retrieved object information on one or more objects within the field of view from the one or more sensors from step b. with the retrieved supplemental object information from step c. in real time to obtain models of the objects that can be displayed as a graphical representation with the same shape, size and orientation as through the said objects were visible to the user; and e. displaying by a display processor the models of objects of step d. in 3D on one or more display elements on the head mounted display device in real time, the objects being in the field of view, and repeating steps a. through e. for each movement of the user which changes said field of view of the user and every time said one or more objects changes a property selected from one or more of a location, orientation or shape, wherein said head mounted display is transparent or semi-transparent to allow the integrated information to be overlaid on the field of view to allow the user to continue to view objects of the one or more medical tools used in real time in the medical procedure and the living bodies and/or living organs in the field of view during the medical procedure.

2. The method of claim 1 further comprising the step of:
calculating relationships between objects using the integrated information obtained in step d.

3. The method of claim 2 wherein the relationship is a distance between the one or more objects of the object information and the one or more objects of the supplemental information.

4. The method of claim 1 wherein said object information is selected from one or more of the group of a shape, size, location and orientation from the one or more sensors.

5. A system for displaying information to a user comprising:

a head mounted display device including one or more sensors for determining a field of view of the user through the head mounted display device the one or more sensors including active sensors for sensing head orientation of the user, head location of the user, eye or eyes location of the user, or the eye or eyes orientation of the user;

one or more sensors for retrieving object information on one or more objects within the medical procedure within the field of view, the one or more objects within the medical procedure include one or more medical tools used in real time in the medical procedure and living bodies and/or living organs of the medical procedure, checking if the properties of the one or more object changed, the properties being selected from location, shape, size and orientation;

a processor, the processor retrieving supplemental object information from data storage, said supplemental information includes one or more 3D generic models of one or more objects from a medical procedure, the supplemental information includes information about the one or more objects of the medical procedure that are in the field of view, the one or more objects from the medical procedure include one or more medical tools used in the medical procedure in real time and living bodies and/or living organs of the medical procedure;

a processor, the processor integrating said retrieved object information on one or more objects within the field of view from the one or more sensors with the retrieved supplemental object information in real time and obtaining models of the said objects that can be displayed as a graphical representation with the same shape, size and orientation as though the said objects were visible to the user; and a display processor, the display processor displaying in 3D the integrated information on one or more display elements on the head mounted display device, said head mounted display is transparent or semi-transparent to allow the integrated information to be overlaid on the field of view to allow the user to continue to view objects of the one or more medical tools used in real time in the medical procedure and the living bodies and/or living organs in the field of view during the medical procedure.

6. The system of claim 5 wherein said supplemental information includes information on shape, size, location or orientation from the one or more generic models of one or more objects.

7. The system of claim 5 wherein said object information includes information on a shape, size, location or orientation from the one or more sensors.

8. The system of claim 5 wherein the processor calculates relationships between said objects using the integrated information.

9. The system of claim 5 wherein the one or more of head orientation sensors and one or more head location sensors are one or more face forward cameras.

10. The system of claim 5 wherein the eye or eyes location sensors and/or eye or eyes orientation sensors is one or more eye facing cameras.

* * * * *